United States Patent [19]
Cordero

[11] Patent Number: 5,775,473
[45] Date of Patent: Jul. 7, 1998

[54] CORD RETRACTOR

[75] Inventor: Jose Cordero, 1647 Sweetwood Dr., Daly City, Calif. 94015

[73] Assignee: Jose Cordero, Daly City, Calif.

[21] Appl. No.: 694,528

[22] Filed: Aug. 8, 1996

[51] Int. Cl.⁶ .................................................. H02G 11/00
[52] U.S. Cl. ............................................... 191/12.2 A
[58] Field of Search ........................ 191/12 R, 12.2 R, 191/12.4, 12.2 A; 439/18, 19

[56] References Cited

U.S. PATENT DOCUMENTS

| | | | |
|---|---|---|---|
| 529,898 | 11/1894 | Curry | 439/19 |
| 1,420,350 | 6/1922 | Thiele | 191/12.2 R |
| 1,731,086 | 10/1929 | Wise. | |
| 1,772,578 | 8/1930 | Levin | 191/12.2 A |
| 1,802,358 | 4/1931 | Smith. | |
| 2,498,609 | 2/1950 | Reil | 191/12.2 |
| 3,110,453 | 11/1963 | Becker et al. | 191/12.2 A |
| 3,715,526 | 2/1973 | Blanch et al. | 191/12.2 R |
| 3,770,914 | 11/1973 | Larsen | 191/12.2 A |
| 3,958,396 | 5/1976 | Keiley et al. | 56/7 |
| 4,003,456 | 1/1977 | Cullen et al. | 191/12.4 |
| 4,436,190 | 3/1984 | Wentzell | 191/12.2 R |
| 4,721,833 | 1/1988 | Dubay | 191/12.4 |
| 4,825,986 | 5/1989 | Pepper | 191/12.4 |
| 4,842,108 | 6/1989 | Anderson et al. | 191/12.2 |
| 4,897,512 | 1/1990 | Johnston | 191/12.4 |

Primary Examiner—Mark T. Le
Attorney, Agent, or Firm—Townsend and Townsend and Crew

[57] ABSTRACT

A cord retractor includes free-wheeling reel upon which an electrical cord is stored, and from which the electrical cord can be played out. A remote finger-depressible switch positioned proximate a free end of the electrical cord operates, when depressed, to simultaneously activate an electric motor and a clutch mechanism that apply a revolving force to the electrical reel to retract the played-out portion of the electrical cord as desired. Input AC power is applied to the cord, switch, and electric motor through a rotating sidewall of the reel. When the is remotely located switch is released, the clutch is disengaged to allow the reel to free-wheel for withdrawal of the electrical cord.

8 Claims, 2 Drawing Sheets

CORD RETRACTOR

FIELD OF THE INVENTION

The present invention relates to a cord retractor for storing and retracting an electric cord and more particularly to a cord retractor for winding up and providing power to an electric cord controlled by a switch located at the end of the electric cord.

BACKGROUND OF THE INVENTION

The storing and retracting of electric cords has traditionally been a problem for electric cord users. The electric cord can become tangled in trees and shrubs or become damaged during operation of electric power equipment. Worse yet is the possibility that the operator can sustain serious injuries if the operator becomes entangled in the power cord or if the power cord is damaged during operation of the electric power equipment.

In several prior art systems, the switch which turns on and off the cord retractor is located on the base unit. This requires the operator to return to the base unit in order to operate the retracting mechanism. Locating the switch on the base unit makes it difficult to operate the retracting mechanism while simultaneously operating the electric power equipment.

In other prior art systems, the operator carries a remote control unit to control the retracting mechanism. Holding a remote control unit in one hand while attempting to operate the electric power equipment is dangerous. It becomes difficult to operate the electric power equipment and the remote control unit simultaneously. Another disadvantage of a remote control unit is that transmission problems from the retracting mechanism to the remote control unit could occur. Transmission problems could occur since electric power equipment is typically used in residential areas where various transmission signals, power lines, cordless telephones, houses, and trees and shrubs are present which could block or interrupt the transmission signal. Also, battery life and distance limitations of the remote control unit are inherent problems. Further, the remote control unit could be lost, damaged or destroyed causing inconvenience to the operator.

Other prior art systems have a motor located inside the reel. A disadvantage of this type of system is that should the motor burn out, the electric cord would have to be removed from the reel before the motor could be replaced or repaired. Further, the reel would have to be taken apart in order to replace or repair the motor.

SUMMARY OF THE INVENTION

The cord retractor of the present invention enables a user to remotely operate an electric-powered reel to selectively retract or withdraw an electrical cord being used to supply electrical power to a piece of equipment (e.g., an electric power mower). Standard AC power is applied through a transport mechanism that operates to communicate that AC power to the operating elements of the cord retractor in a manner that removes the danger and inconvenience of the power cord becoming tangled by the revolving action of the reel. The ability to retract the electrical cord as desired eliminates the danger of the played out portion of the electrical cord becoming entangled in trees and shrubs or becoming damaged by the mower.

According to the present invention, the electric cord is stored, and played out from, a reel that is selectively powered by an electric motor through a drive train that includes an electromechanical clutch mechanism. A finger-depressible switch, located at the free end of the electrical cord, operates when depressed to simultaneously apply electrical power to the electric motor and to the clutch mechanism for communicating the motor's driving force to the reel and retract the played-out portion of the electric cord for so long as the switch is depressed. Releasing the switch removes electric power from both the electric motor and the clutch mechanism, releasing the reel and allowing it to free-wheel so that the electric cord stored thereon can be withdrawn as desired or needed.

Standard household 120 volt AC is used. The invention incorporates a transfer mechanism that receives the input AC for communication to the electric cord and remote switch in a manner that does not impede the rotation of the reel. The switch incorporates a two-position design. A first position, removes electrical power from the electric motor and clutch mechanism, allowing the reel to free-wheel so that the electric cord can be unwound from the reel. In the second position, the switch completes an electrical circuit that applies AC to the motor and clutch mechanism to communicate the driving force developed by the motor to the reel, to retract the cord.

Operating the cord retractor from a remote location prevents the operator from having to continuously return to the base unit. Further, if the electric motor fails in the present invention, the motor can be easily repaired or replaced without the inconvenience of taking the reel apart or disassembling the entire cord retractor. Additionally, the electric cord does not have to be removed from the reel to repair or replace the motor. By utilizing the present invention, the motor can be repaired or replaced within minutes. In addition, the transmission problems and distance limitations with remote control units are eliminated by having the switch wiring travel the entire distance of the electric cord. The remote location of the switch allows the user to control the cord retractor while simultaneously operating the electric power equipment.

These and other features and advantageous will become apparent to those skilled in this art upon a reading of the following description of the invention which should be taken in conjunction with the accompanying drawings.

DESCRIPTION OF THE PREFERRED EMBODIMENT

Figure 1:
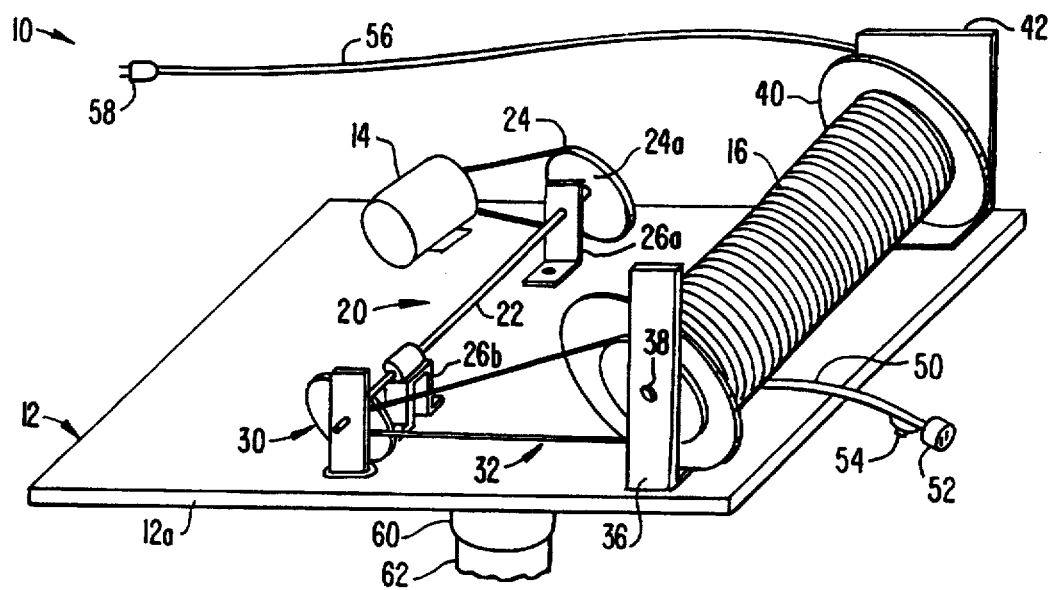
FIG. 1 is a perspective view of a cord retractor constructed according to the present invention.

Turning now to the figures, and for the moment specifically FIG. 1, the cord retractor of the present invention is illustrated, designated generally with the reference numeral 10. As shown, the cord retractor 10 includes a platform 12 upon which is mounted an electrical motor 14, a retractor reel 16, the motor 14 and reel 16 being operatively intercoupled by a drive mechanism designated generally as 20. The drive mechanism 20 includes a drive shaft 22 at one end of which is fixedly mounted a conventional V-belt drive assembly 24. The drive shaft 22 is held in place by upright mounts 26 (26a, 26b) journaled to receive and pass through the drive shaft 22 for rotation.

The motor 14 has attached a small drive shreave (not shown) to drive, when the motor is activated, the V-belt drive assembly 24 and rotate the drive wheel 24, in turn rotating the drive shaft 22 to which the wheel 24a is attached at one end.

At the other end of the drive shaft 22 is a electrically operated clutch mechanism 30 that connects, through another V-belt drive assembly 32, to one end of the retractor reel 16. The retractor reel 16 is mounted, at one end, by a upright post 36, to which the retractor reel 16 is journaled at 38. The other end of the retractor reel 16 has a end-plate 40 that is journaled for rotatable mounting to a sidewall 42 of the retractor reel 16. As will be seen, the end plate 40 and sidewall 42 form a transfer mechanism that operates to transfer input AC electrical power to the electrical cord 50 that is wound upon the reel 16 for storage thereon as well as to the other powered elements of the retractor 10. The transfer mechanism, shown more particularly in FIGS. 3A, 3B, and 5 will be discussed below.

Figure 6:
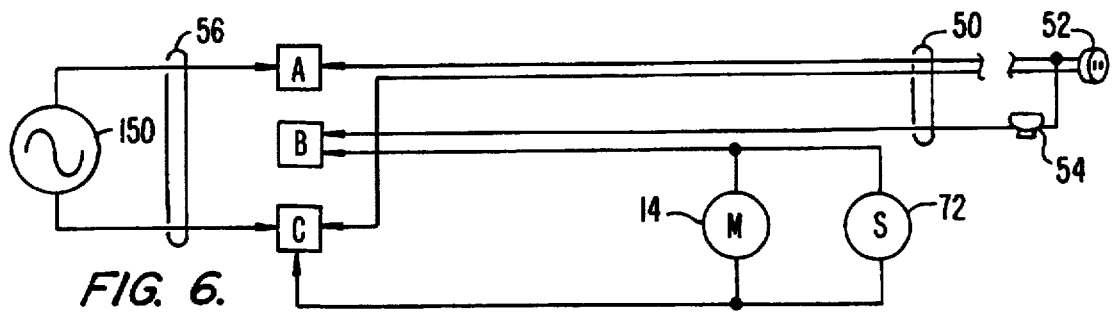
FIG. 6 is a schematic diagram showing the AC connections used in the invention shown is FIG. 1 to selectively activate operation of the motor and clutch mechanism to retract an electrical cord onto the reel of FIG. 1.

As indicated, wound upon the reel 16 is an elongate, electrical cord 50 having a distal end 52 that forms a standard electrical outlet for receiving a plug of, for example, an electrical lawn mower. The cord 50 is formed to include three electrical wires—as shown in FIG. 6: two to communicate AC power to the distal end 52, the third for a finger depressible switch 54 located proximate the distal end to selectively switch the third wire. As will be seen, when the finger depressible switch is depressed it will simultaneously activate the motor 14 and clutch mechanism 30 so that rotational force developed by the motor 14 will be transferred to the reel 16 to retract the electrical cord 50.

Continuing with FIG. 1, the platform 12 has mounted on the underside 12a thereof a cylindrical collar 60 that is formed and configured to receive the uppermost portion of a upright, and also cylindrical, post 62. The collar 60 and post 62 allow the platform to rotate horizontally so that the reel 16 can follow the electrical cord 50. Standard household AC power is coupled to the electrical cord 50, from an input line 56, through the transfer mechanism (illustrated and discussed further below). As FIG. 1 shows, the electrical cord 56 includes, at its distal end, a two-prong, male plug configured and adapted to be received by a conventional, household AC outlet.

Figure 2:
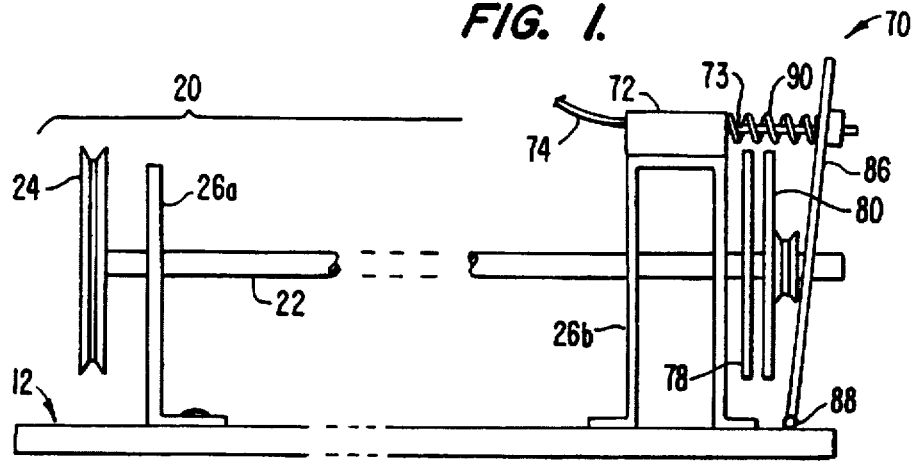
FIG. 2 is a better view of the arrangement, including a clutch mechanism, used in the invention shown in FIG. 1 to selectively convey the drive forces developed by the motor to the reel that stores the electrical cord.

FIG. 2 illustrates the drive mechanism 20, and in particular a clutch mechanism 70, operating to transfer power from the motor 14 to the retractor reel. As FIG. 2 shows the larger shreave 24a of the v-belt drive assembly 24 (FIG. 1) without the belt itself in order to avoid unduly complicating the drawing. As FIG. 2 also shows, the drive shaft 22 is rotatably held by the L-shaped upright 26a and the inverted U-shaped upright 26b. Mounted at the top of the upright 26b is a solenoid 72, forming the part of the clutch mechanism 70. Electrical wiring 74 couples the solenoid 72 to the transfer mechanism (discussed below) to receive electrical power.

The clutch mechanism 70 includes a drive plate 78 fixedly mounted to the drive shaft 22 for rotation therewith, and a clutch plate 80 that is apertured to have the drive shaft 22 pass therethrough, yet allow the clutch plate 80 to freely rotate thereon. Fixedly attached to an outer surface of the clutch plate 80 is a small shreave, forming a part of the V-belt drive assembly 32 (FIG. 1) that will drive the retractor reel 16. Finally, a clutch hinge plate 86 is hingedly mounted at 88 to the platform 12 for rotation about 88.

The solenoid 72 includes a pull arm 73 having one end affixed to an upper portion of the clutch hinge plate 86.

In operation, and with power not applied to the electric motor 14 or the solenoid 72, the helical spring 90 biases the clutch hinge plate 86 away from the solenoid 72, allowing the clutch plate 82 to freewheel on the drive shaft 22. However, when the finger depressible switch 54 is depressed, electrical power will be simultaneously applied to the motor 14 and the solenoid 72. Electrical power will cause the solenoid 72 to withdraw the pull arm 73 to move the clutch hinge plate 86 about its hinge connection 88, and toward the drive plate 78. This movement of the clutch hinge plate 86 forces the clutch plate 82 into frictional engagement with the drive plate 78. The drive shaft 22 is now rotating as a result of the operation of the motor 14 (which transfers power through the V-belt drive assembly 24 to the drive shaft 22). Placing the clutch plate 82 into frictional engagement with the drive plate 78 causes the clutch plate 82 to also rotate, and with it the attached shreave 84. Shreave 84, in turn, will drive the V-belt assembly 32 (FIG. 1), to rotate the reel 16 and retract the electrical cord 50.

When the finger depressible switch 54 is released, electrical power is withdrawn from both the motor 14 and the solenoid 72. Rotational power to the drive shaft 22 is removed, and the pull arm 73 of the solenoid 72 released. The helical spring 90 biases the clutch hinge plate 86 away from the drive plate 78, releasing the clutch plate 82 from its frictional engagement with the drive plate 78. Concomitantly, retractional rotation of the retraction reel 16 ceases. The clutch plate 82 is now allowed to freewheel on the drive shaft 22 so that, when necessary or desired, one may pull on the electrical cord 50 to play out or otherwise withdraw the electrical cord 50 from the reel 16.

Figures 3A, 3B, 4:
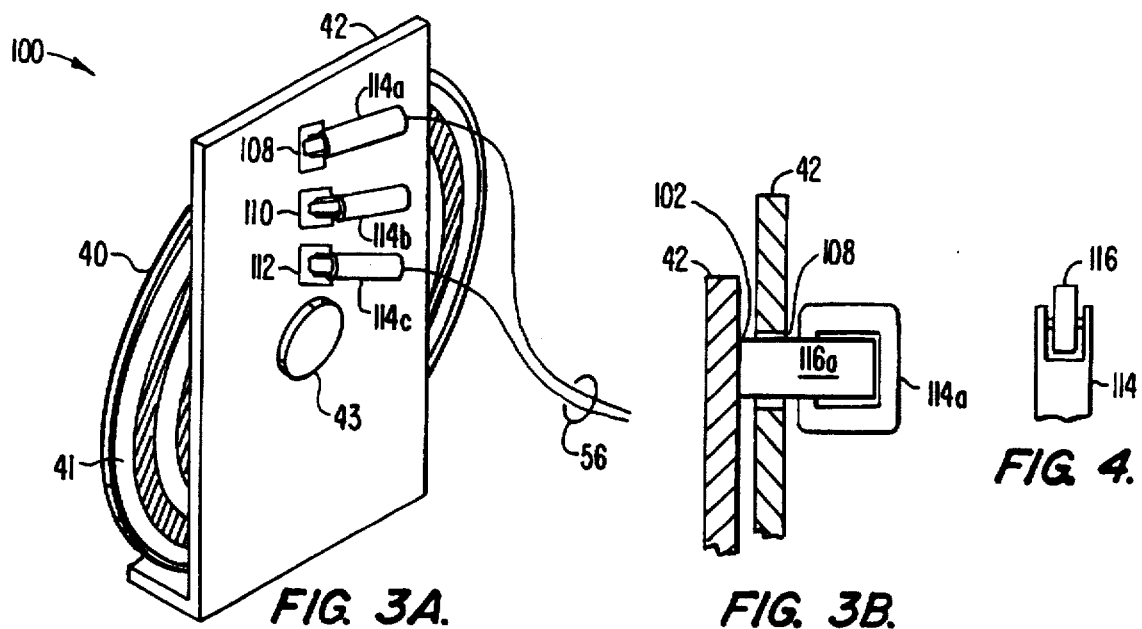
FIGS. 3A and 3B show the transfer mechanism of FIG. 1 to communicate input AC through a revolving sidewall of the reel of FIG. 1 to the electrical cord, the remote switch, the electrical motor and the clutch mechanism.
FIG. 4 is a partial view of a contact used with the transfer mechanism.

In order to transfer the incoming AC electrical power from the input line 56 to the electrical cord 50, without tangling the electrical cord 50, a transfer mechanism is used. Referring first to FIG. 3A the transfer mechanism is shown as including the sidewall 40 of the retractor reel 16 (FIG. 1) and the cover plate 42 to which the retractor reel 16 is rotatably journaled at 43 (FIG. 3A). Formed on an outward facing surface 41 of the sidewall 42 that is juxtaposed to the cover plate 41, are three concentric electrically-conducting paths 102, 104, 106, better illustrated in FIG. 5. The sidewall itself is fabricated from an electrically insulative material. Access to the paths 102–106 from an exterior surface of the cover plate 42 is provided by apertures 108, 110, and 112 (FIG. 3A). Mounted on the exterior surface of the cover plate 42 (i.e., that opposite from the surface confronting sidewall 40) are contact fingers 114 (114a, 114b, 114c). As better illustrated in FIG. 4, each contact finger 114 has rotatably mounted at a distal end thereof a disk-shaped roller 116 (FIG. 4) that will be situated, when the contact finger is appropriately mounted to the cover plate 42, to have a portion protrude through the corresponding aperture 108, 110, 112 and placed in contact with, or ride upon the electrical paths 102–106. This is better illustrated in FIG. 3B, showing from an end view the finger contact 114a and its associated roller 116a of contact finger 114a protruding through the aperture 108 formed in the cover plate 42 so that the roller 116 is in electrical contact with the conductive path 102. The contact fingers 114, and associated rollers 116, maintain electrical contact with the paths 102–106 as the retractor reel 16 revolves, either retracting the electrical cord 50, or allowing it to be withdrawn.

Figure 5:
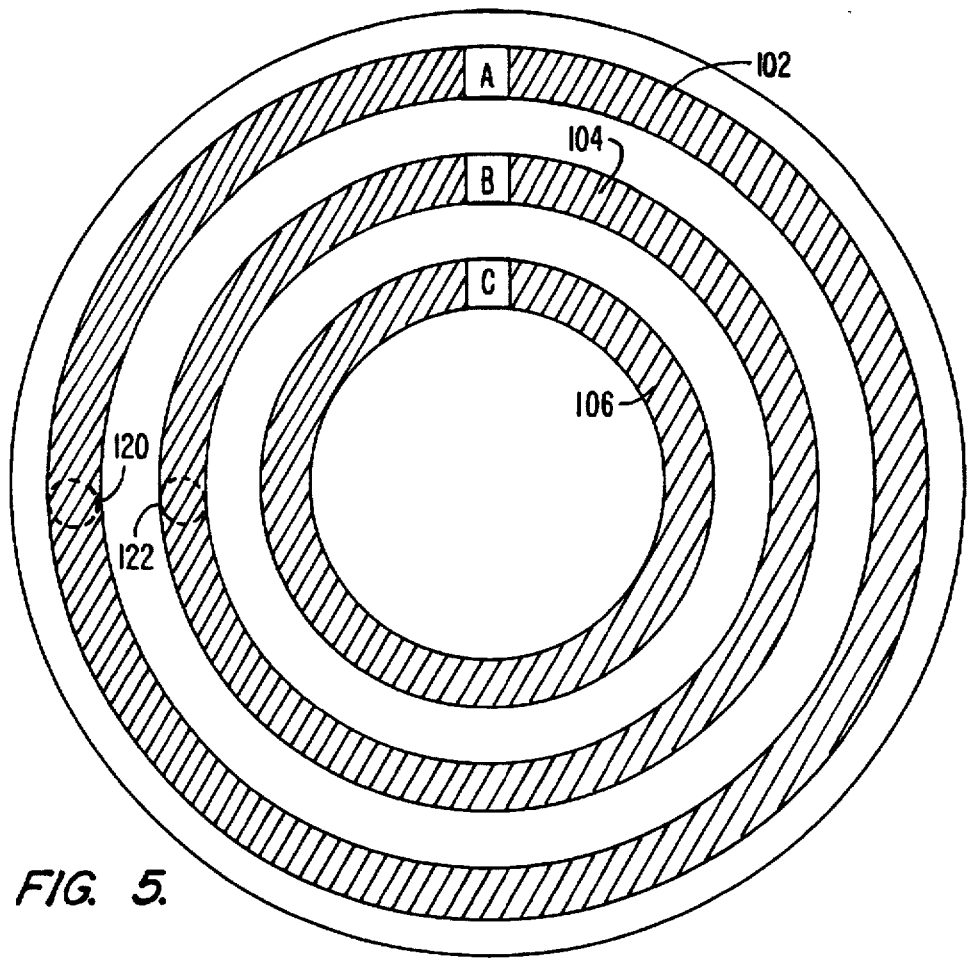
FIG. 5 is a plan view of one surface of the sidewall of the reel used in the transfer mechanism, showing concentric circuit paths formed thereon.

FIG. 5 illustrates the surface 41 of the sidewall 40, showing the conductive paths 102–108. Attachment of two-wire end of the electrical cord 50, that is, the end opposite the end to which the receptacle 52 is attached, is represented at 120, 122. Although not specifically shown, it will be appreciated that the sidewall 40 will be apertured to provide access to the conductive paths 102, 104 for the attachments 120, 122. The points labelled A, B, and C represent the contact points between the rollers 116a, 116b, and 116c of contact fingers 114, respectively. The two lines of the input line 56 are electrically connected to the paths contact fingers 114a and 114c and thereby to the conductive paths 102 and 106 through the contact points A and C.

The circuit connections between the motor 14, finger depressible switch 54, and solenoid 72 through the contact points A, B, and C (and associated finger contacts 114) are illustrated by the electrical diagram shown in FIG. 6. It will be appreciated that although not specifically shown in FIG. 6, all connections to the contact points A, B, C, with one exception, are made through the corresponding contact fingers 114. Thus, for example, although FIG. 6 shows a single wire 54a coming from the finger-depressible switch 54 to contact point B, the actual connection of the wire 54a would be to the contact finger 114b associated with the contact point B. In similar fashion the input wires 56 would be coupled to finger contacts 114a and 114c, and the motor 14 and solenoid 72 (through wires 74; see FIG. 2) would be coupled to contact finger contacts 114b and 114c for electrical connection to contact points B and C and therethrough to conductive paths 104, 106.

As FIG. 6 shows, the AC input supplied by the input line 56 is kept from both the motor 15 and the solenoid 72. However, the when the finger depressible switch 54 is depressed, a circuit is formed to supply one side of the household AC source (represented as 150) to the motor 14 and the solenoid 72, virtually simultaneously. That path is formed by one lead (from contact point A) of the cord 50, through the now-closed finger-depressible switch 54, through wire 54a to contact point B, and from there to one side of the motor 14 and solenoid 72. As can be seen, the other sides of the motor 14 and solenoid 72 are connected, through contact point C to one lead (of two) of the source 150. This will activate the motor, supplying rotational drive via the V-belt drive 24, to the drive shaft 22. At the same time, the solenoid 72 will cause the clutch hinge plate 86 to move the clutch plate 82 into engagement with the now-rotating drive plate 78 to, in turn, engage the v-belt drive 32 to rotate the retractor reel 16.

Preferably, the "hot" side of the AC source 150 is coupled to the contact point C, while the return side of the AC source is coupled to the contact point A. This allows the switch 54 to switch the return side of the motor 14 and solenoid 72 rather than the hot side.

Releasing the finger depressible switch 54 breaks the communication of AC power to and across the motor 14 and solenoid 72. Motor 14 terminates its driving force, and solenoid 72 releases its pull arm 73. Hinged clutch plate 86 is biased outwardly by helical spring 90, releasing the engagement of clutch plate 82 with drive plate 78. Retractor reel 16 is now in a free wheeling condition, allowing a user to withdraw the electrical cord 50.

In order to increase the frictional engagement needed between the drive plate 78 and the clutch plate 82 for efficient transfer of power, the surface of the clutch plate 82 that confronts and engages the drive plate 88 should be roughened or, preferably, provided with a soft rubber clutch surface.

Also, while a variety of electrical motors can be used, depending upon the torque required, the present invention employs a one-third horsepower AC (115 volt, 60 cycle) motor.

Figure 7:
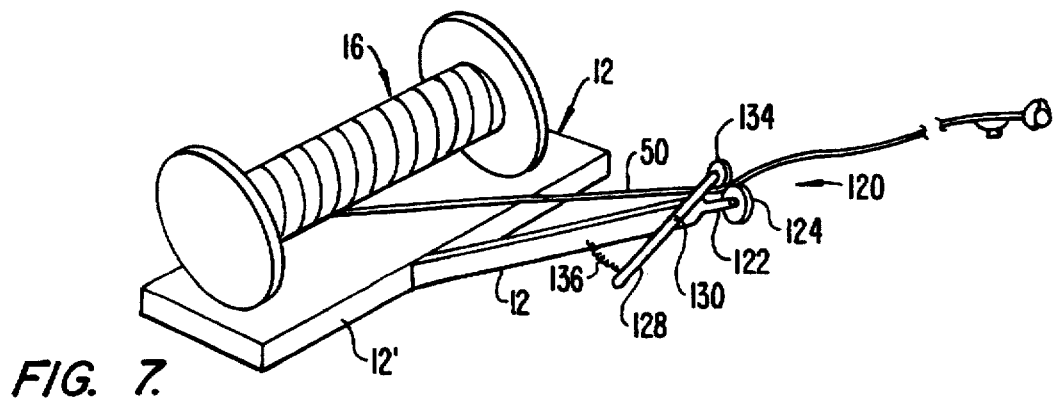
FIG. 7 illustrates an alternate embodiment of the invention in which a forward-extending guide arm that is used to capture the electrical cord so that, as the cord is withdrawn from the reel, the reel is permitted to rotate to follow the withdrawn cord portion.

Turning now to FIG. 7, an alternate embodiment of the invention is shown. Mounted or otherwise attached in conventional fashion to the edge 12' of the platform 12 proximate the reel 16 is a guide mechanism 120. The guide mechanism 120 includes an extending guide arm member 121, the distal end 122 of which is forked to receive a guide wheel 124 that is rotatably journaled to the end 122. The guide wheel is preferably furrowed at it peripheral edge to receive the electrical cord 54. A pincher arm 128 is attached to the guide arm 121 proximate the end 122 in a manner that allows the pincher arm 128 to rotate about the attachment (at 130). One end of the pincher arm 128 has a smaller wheel 134 journaled thereto, while the other end of the pincher arm 128 is biased toward the guide arm by a conventional spring 136. The smaller wheel 134 is, in the same manner as the guide wheel 124, provided with a periphery that is grooved, and the wheels 124, 134 situated so that the grooves formed in their respective peripheries are confronting to constitute a passage through which the electrical cord 54 can pass as shown in FIG. 7.

In operation, the cord is located at the end 122 of the guide arm 124 by its capture between the guide wheel 124 and smaller wheel 134. The electrical cord is help in place at the end 122 of the guide arm 121 by the biasing action of the spring 136 which pivots the pincher arm 128 about its attachment point 130 to hold the smaller wheel 134 proximate the guide wheel 124. As the use moves about, withdrawing the electrical cord 54 from, or retracting it onto, the reel 16, the guide mechanism 120 operates to allow the cord retractor 10 to follow the user. This, in turn, maintains the electrical cord 54 at an approximate 90 degree angle with the reel 16 to allow easier retraction and storage of the cord, or unrestricted withdrawal.

While a complete description of the preferred embodiments of the invention has been described, it will be obvious to those skilled in this art that various modifications and alterations can be made. For example, while a standard v-belt drive has been illustrated, other drive mechanisms can be used such as chain drives.

What is claimed is:

1. A transfer mechanism for transferring electrical power to a rotating plate comprising:

a retraction reel;

a rotating plate attached to and positioned concentric with the retraction reel, the rotating plate having a first surface upon which is formed a plurality of concentric current carrying paths;

a stationary, non-conducting mounting plate juxtaposed with the first surface of the rotating plate;

a plurality of electrical contacts each one of the plurality of electric contacts having at one end a roller that is positioned to protrude through a corresponding aperture in the mounting plate and placed in electrical contact with a corresponding one of the plurality of concentric current carrying paths; and a source of alternating current having first and second leads respectively coupled to first and second ones of the plurality of concentric current carrying paths, an electric motor coupled through a pair of the plurality electrical contacts to the second one and a third one of the concentric current carrying paths, and a switch connected in series through corresponding ones of the electrical contacts between the first and third ones of the plurality of concentric current carrying paths, the switch operating in a first position to apply alternating current to the electric motor, and in a second position to prevent alternating current from being applied to the electric motor.

2. The transfer mechanism of claim 1, wherein the plate is fabricated from an electrically insulative material.

3. The transfer mechanism of claim 2, wherein the retraction reel is mounted for rotation, and the electric motor being coupled to rotate the retraction when alternating current is applied to the electric motor.

4. The transfer mechanism of claim 3, wherein the retraction reel is mounted to be free wheeling when alternating current is not applied to the electric motor.

5. The transfer mechanism of claim 2, including an electric cord wound upon the retraction reel to be extracted therefrom when alternating current is not applied to the electric motor, and to be retracted upon the retraction reel when alternating power is applied to the electric motor.

6. The transfer mechanism of claim 5, wherein the electric cord includes first and second electrical wires respectively coupled to the first and second ones of the plurality of concentric current carrying paths, and an electrical outlet at a distal end of the first and second electrical wires, the first and second electrical wires operating to communicate alternating current to the electrical outlet.

7. The transfer mechanism of claim 6, wherein the switch is mounted to the electrical cord proximate the electrical outlet.

8. A transfer mechanism for selectively applying electric current to a rotatable retraction reel to retract an electric cord onto the retraction reel, the transfer mechanism comprising:

a planar surface formed at an end of the retraction reel, the planar surface having a number of concentric current carrying paths formed thereon;

a mounting plate for rotatably mounting the retraction reel, the mounting plate being in juxtaposition with the planar surface;

at least first, second, and third contact elements mounted to the mounting plate in a manner that places the mounting plate between the first, second, and third contact elements and the number of current carrying paths, each of the first, second, and third contact elements being mounted proximate corresponding apertures formed in the mounting plate, the contact elements being in electrical contact with corresponding ones of the current carrying paths through apertures formed in the mounting plate;

a source of alternating current coupled between the first and third contact elements;

an electric motor connected between the second and third contact elements, and coupled to the retraction reel to rotate the retraction reel when alternating current is applied to the electric motor;

a solenoid element connect in parallel circuit configuration with the electric motor and between the second and third contact elements;

a switch connected between the first and second contact elements, the switch being operable in a first mode to apply alternating current to the electric motor and to the solenoid element, and in a second mode interrupting alternating current to the electric motor and solenoid element; and a clutch element connected to the electric motor and to the solenoid element, the clutch element being positioned to engage and rotate the retraction reel when alternating current is applied to the electric motor and the solenoid element.

* * * * *